United States Patent
Ko et al.

(10) Patent No.: US 7,145,516 B2
(45) Date of Patent: Dec. 5, 2006

(54) WIRELESS INTERNAL ANTENNA FOR HOME NETWORK AND DIGITAL ELECTRIC HOME APPLIANCE

(75) Inventors: Young-Joon Ko, Seoul (KR); Jae-Yeong Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/994,470

(22) Filed: Nov. 23, 2004

(65) Prior Publication Data

US 2005/0110690 A1 May 26, 2005

(30) Foreign Application Priority Data

Nov. 25, 2003 (KR) ............ 10-2003-0084161

(51) Int. Cl.
*H01Q 13/10* (2006.01)
*H01Q 1/38* (2006.01)

(52) U.S. Cl. ............. 343/767; 343/700 MS; 343/702; 343/746

(58) Field of Classification Search ......... 343/700 MS, 343/767, 702, 746
See application file for complete search history.

(56) References Cited

U.S. PATENT DOCUMENTS 5,872,542 A 2/1999 Simons et al.
6,466,170 B1 * 10/2002 Zhou .................. 343/700 MS
6,762,729 B1 * 7/2004 Egashira ..................... 343/767
2004/0189528 A1 * 9/2004 Killen et al. ......... 343/700 MS

FOREIGN PATENT DOCUMENTS

KR 2002-0062396 A 7/2002
KR 2003-0088987 A 11/2003

* cited by examiner

*Primary Examiner*—Trinh Vo Dinh
(74) *Attorney, Agent, or Firm*—Birch, Stewart, Kolasch & Birch, LLP

(57) ABSTRACT

Disclosed is a wireless internal antenna for a home network and digital electric home appliance which comprises: a wireless antenna for a client having a tuning slot at an upper surface of a client device to realize an impedance matching at a band of IEEE802.11b (a band of 2.4 GHz) and having a certain type patch pole at a lower surface of the client device to have return characteristics at a band of IEEE802.11a (a band of 5 GHz); and a wireless antenna for a server, enabling transmission/reception to/from the client device, having an air slot at an upper surface of a server device and a feeding line at a lower surface thereof, and the server device is supported at a ground plate by a supporting portion installed at a lower part thereof.

29 Claims, 12 Drawing Sheets

WIRELESS INTERNAL ANTENNA FOR HOME NETWORK AND DIGITAL ELECTRIC HOME APPLIANCE

BACKGROUND OF THE INVENTION

1. Field of the Invention

The present invention relates to a wireless internal antenna for a home network and a digital electric home appliance, and particularly, to a wireless internal antenna for a home network and a digital electric home appliance installed in a server and a client for embodying a home network.

2. Description of the Background Art

Recently, since a wireless network technique improved, an internet digital information home appliance (e.g., a remote control of home electronics, an electronic commercial transaction through an internet, a game, an education, a business, etc) has been improved by accessing to digital products (such as a digital TV, DVD, an internet refrigerator, a computer, a telecommunications equipment, and so on) using a home network.

In general, a home network includes such networks, namely, an information network connecting a PC to peripheral devices, an AV network connecting a PC to a TV receiver, a digital setup box, a stereo, or the like, and a home appliance network connecting a PC to an air-conditioner, a refrigerator, or the like.

For implementing the home network, there is required a server such as PC, a standardized home electronics controlled by a digital signal sent by the server, namely, a client, and a communication-based technology to allow the server and the client to communicate each other on an network.

In the communication-based technology, an IEEE (Institute of Electrical and Electronics Engineers) specified a communication band standardized for embodying a home network. IEEE 802b(a band of 2.4 GHz) or IEEE 802a(a band of 5 GHz) is a type of the communication band standardized by the IEEE.

In this home network, a wireless antenna is used in a server and a client to transmit and receive a digital signal. The conventional wireless antenna by nature is difficult to be miniaturized due to its sensitivity with respect to frequency variation according to circumferential environments. Thus, it is usually used as an external type antenna.

However, this external wireless antenna is mounted on the outside of each server and client, which results in its disfigurement and its fragility during transportation or movement. As a result of this, because the antenna can not perform an impedance matching, its receive sensitivity is degraded and even reception can be impossible thereby.

SUMMARY OF THE INVENTION

Therefore, an object of the present invention is to provide a wireless internal antenna for a home network and digital electric home appliance capable of protecting appearances of a server and a client and of preventing its breakage by installed in the server and the client as a microminiature.

Another object of the present invention is to provide a wireless internal antenna for a home network and digital electric home appliance having superior characteristics associated with a dual band of a band of IEEE802.11b (a band of 2.4 GHz) and a band of IEEE802.11a (a band of 5 GHz). The invented antennas can be used for all indoor server and client systems in all frequency bands for IEEE802b (a band of 2.4 GHz) or IEEE802a (a band of 5 GHz).

To achieve these and other advantages and in accordance with the purpose of the present invention, as embodied and broadly described herein, there is provided a wireless internal antenna for a home network and digital electric home appliance, including: a wireless antenna for a client having a tuning slot at an upper surface of a client device to realize an impedance matching at a band of IEEE802.11b (a band of 2.4 GHz) and having a certain type patch pole at a lower surface of the client device to have return characteristics at a band of IEEE802.11a (a band of 5 GHz); and a wireless antenna for a server, enabling transmission/reception to/from the client device, having an air slot at an upper surface of a server device and a feeding line at a lower surface thereof, and the server device being supported at a ground plate by a supporting portion installed at a lower part thereof.

The slot of the wireless antenna for the server can be transformed into a bowtie shape, rectangular shape, or "H" shape, and the feeding line of the wireless antenna for the server can be transformed into a straight-line shape. Also, the tuning slot of the wireless antenna for the client can be transformed into a rectangular shape, a triangular shape, or "T" shape, and the patch pole of the wireless antenna for the client can be transformed into a circular shape, a triangular shape, or a square shape.

The server device can be horizontally placed with respect to the ground plate.

The supporting portion supports four edges of the server device, and the wireless antenna for the server has a return portion at an upper surface of the ground plate to have a directional emission pattern.

The wireless antenna for the client has a non-directional emission pattern and the wireless antenna for the server has a directional emission pattern.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Hereinafter, it will be explained of a wireless internal antenna for a home network and digital electric home appliance in accordance with the present invention with reference to the attached drawings.

As can be seen from FIGS. 1 to 6, the wireless internal antenna for the home network and digital electric home appliance includes: a wireless antenna for a client 110 having a tuning slot 113 at an upper surface of a client device 111 to realize an impedance matching at a first communication band (e.g., the band of IEEE802.11b (a band of 2.4 GHz)) and having a certain type patch pole 115 at a lower surface of the client device 111 to have return characteristics at a second communication band (e.g., the band of IEEE802.11a (a band of 5 GHz)); and a wireless antenna for a server 120, enabling transmission/reception to/from the client device 111, having an air slot 123 at an upper surface of a server device 121 and a feeding line 125 at a lower surface thereof, and the server device 121 being supported at a ground plate 129 by a supporting portion 127 installed at a lower part thereof.

Figure 1:
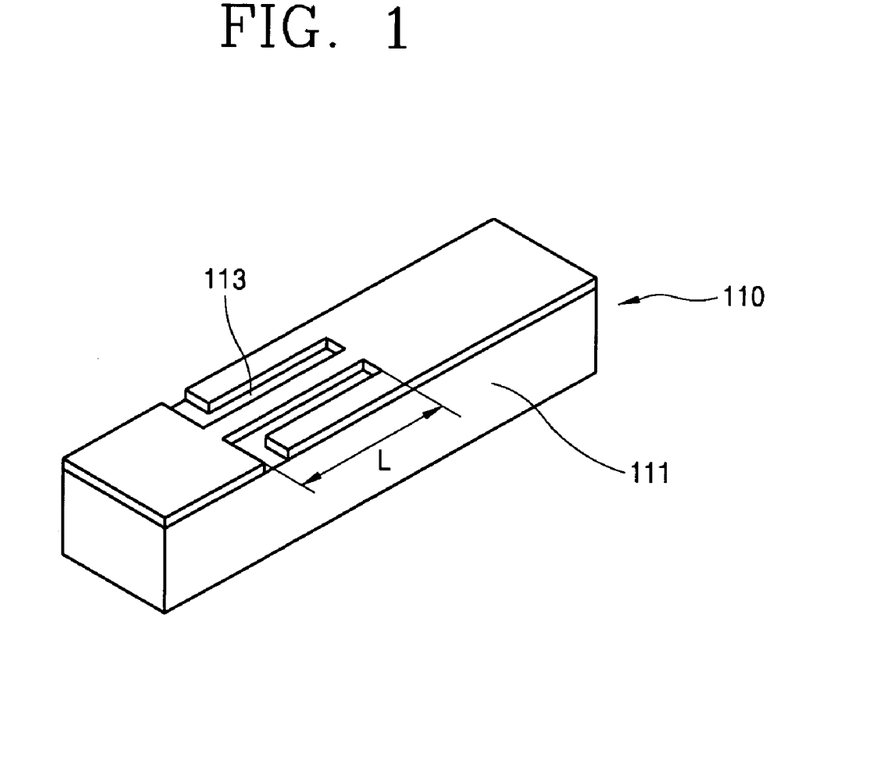
FIG. 1 is a perspective view showing a wireless antenna for a client in a wireless internal antenna for a home network and digital electric home appliance in accordance with the present invention.
Figure 2:
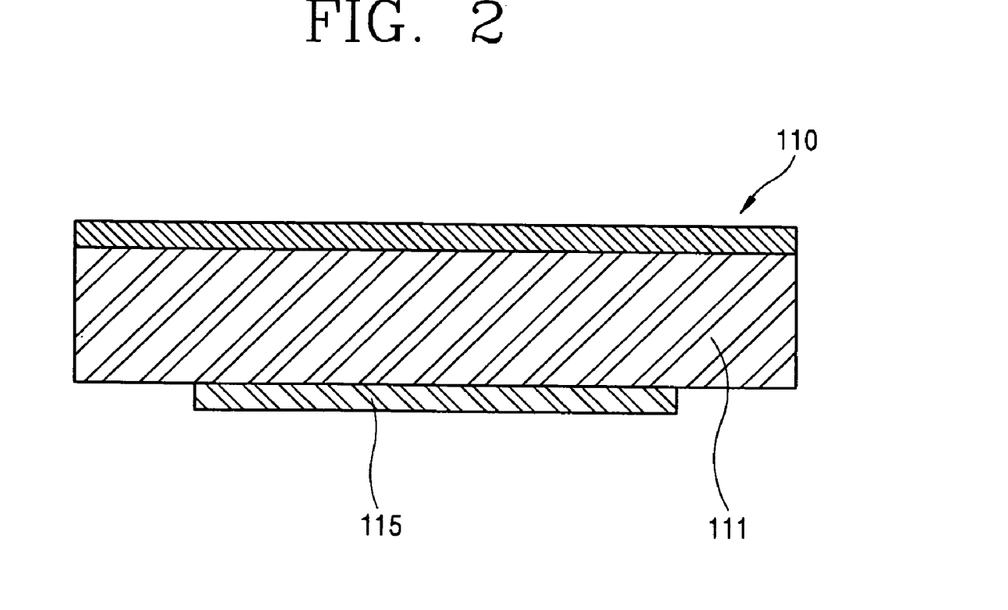
FIG. 2 is a cross-sectional view for the view shown in FIG. 1.

The tuning slot 113 of the wireless antenna for the client 110 serves as an impedance varying unit. That is, a length (L) of the tuning slot 113 can be properly adjusted thereby to realize a resonance frequency and an impedance matching.

Figure 3:
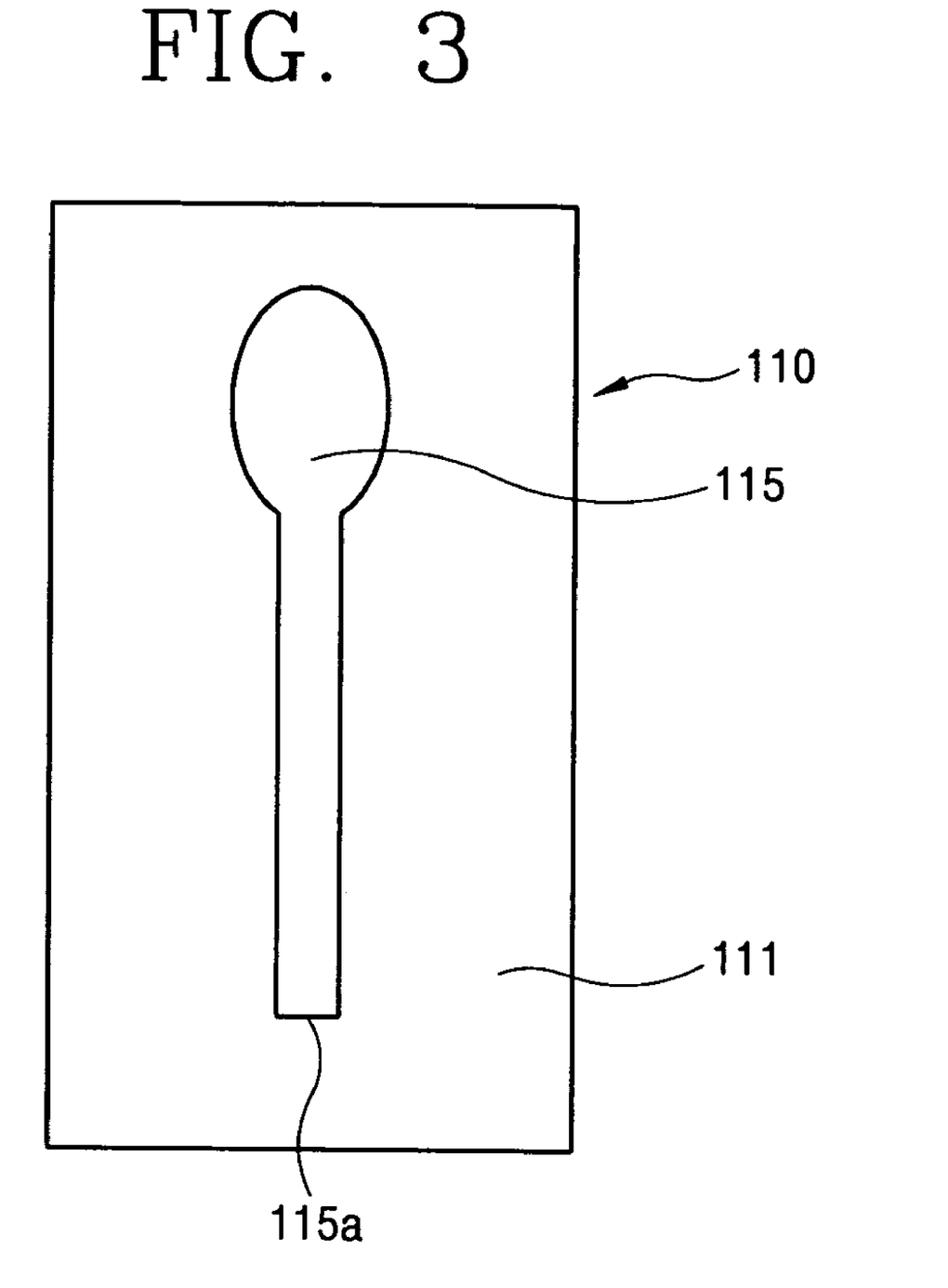
FIG. 3 is a bottom view showing a bottom pattern of the wireless antenna for the client in the wireless internal antenna for a home network and digital electric home appliance in accordance with the present invention.

Input/output of a signal is performed through an end 115a of the patch pole 115 of the wireless antenna for the client 110.

Figure 10A:
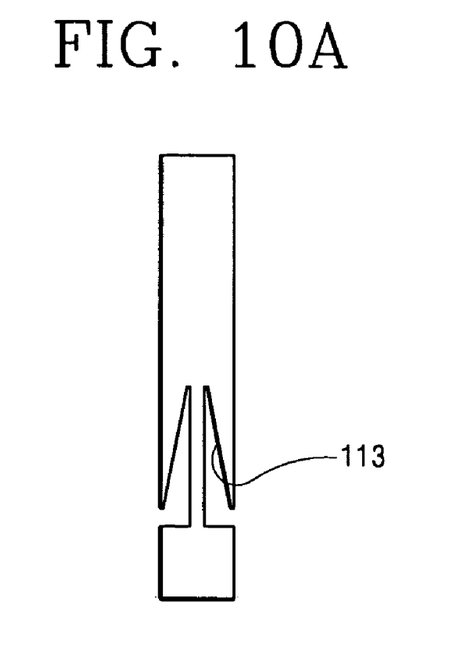
FIGS. 10A and 10B are plane views showing respective different examples for the top pattern of the wireless antenna for the client in the wireless internal antenna for a home network and digital electric home appliance in accordance with the present invention.
Figure 10B:
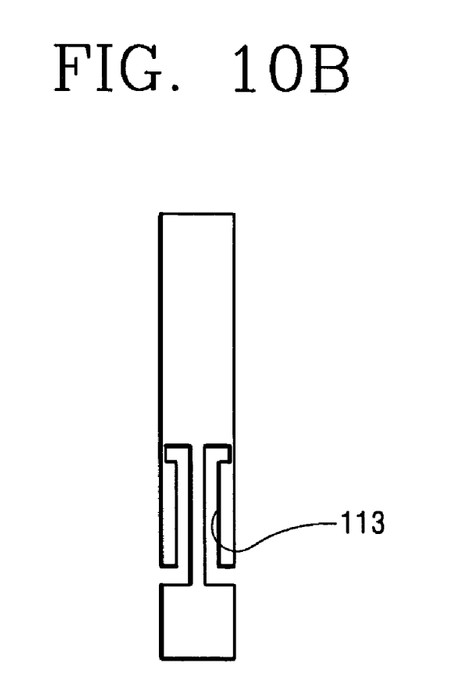

The tuning slot 113 of the wireless antenna for the client 110, as shown in FIG. 10A, can be shaped similar to a triangle, and, as shown in FIG. 10B, shaped similar to "T" shape.

Figure 11A:
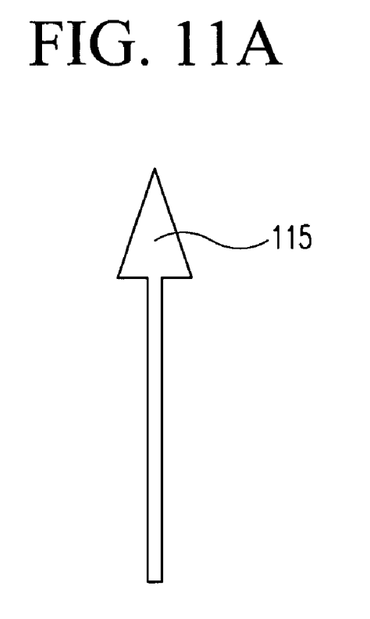
FIGS. 11A–11C are plane views showing respective different examples for a bottom pattern of the wireless antenna for the client in the wireless internal antenna for a home network and digital electric home appliance in accordance with the present invention.
Figure 11B:
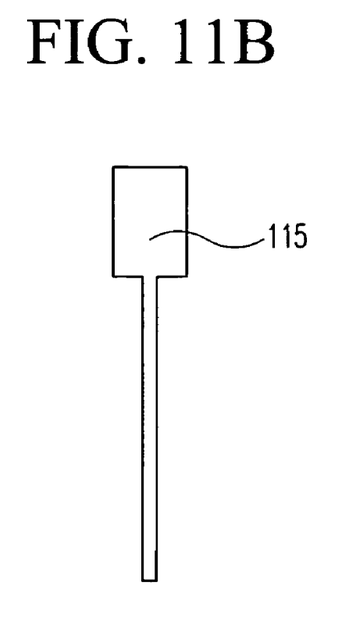
Figure 11C:
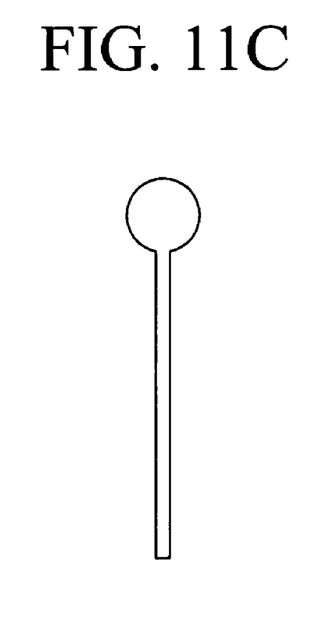

The patch pole 115 of the wireless antenna for the client 110, as shown in FIG. 11A, can be shaped similar to a triangle, and, as shown in FIG. 11B, shaped similar to a square. Similarly, the patch pole 115 can be shaped similar to a circle as shown in FIG. 11C.

Figure 9:
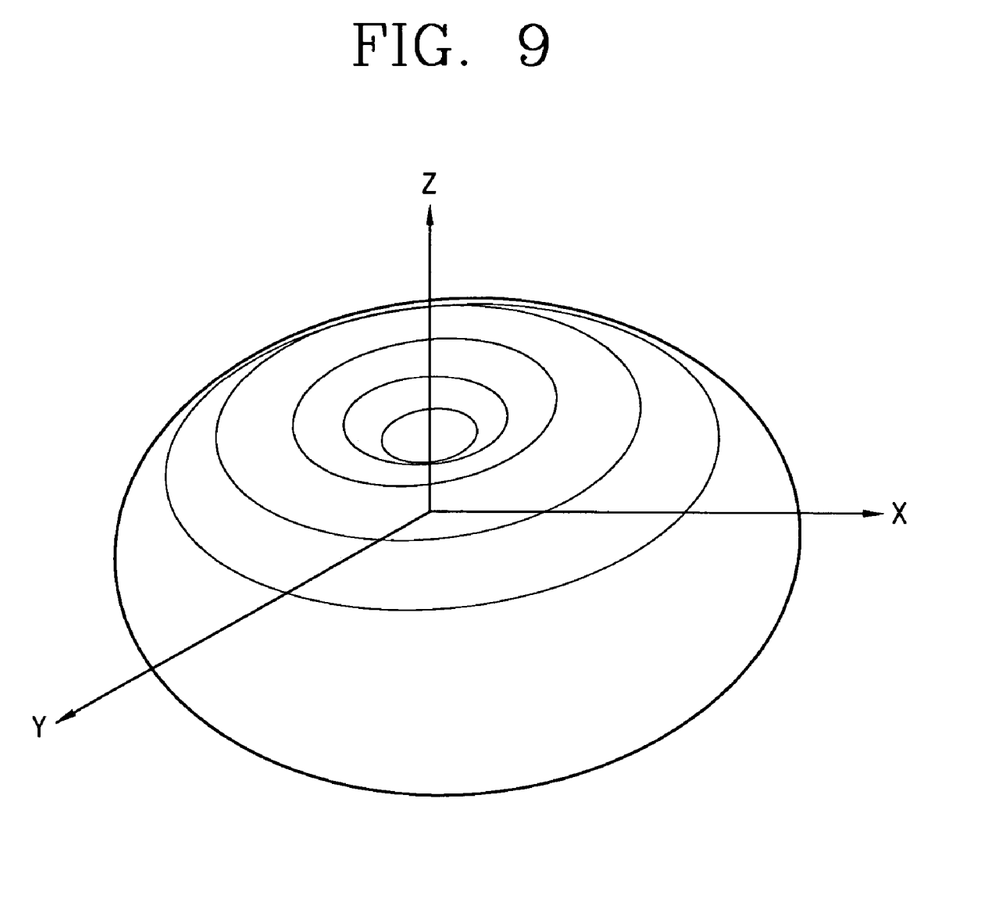
FIG. 9 is a perspective view showing an emission pattern of the wireless antenna for the client in the wireless internal antenna for a home network and digital electric home appliance in accordance with the present invention.

Also, in order to easily detect a signal transmitted from every directions, the wireless antenna for the client 110, as shown in FIG. 9, can preferably have a non-directional emission pattern.

The air slot 123 of the wireless antenna for the server 120 can be transformed into a rectangular or a "H" shape even though they are not shown in drawings.

Figure 4:
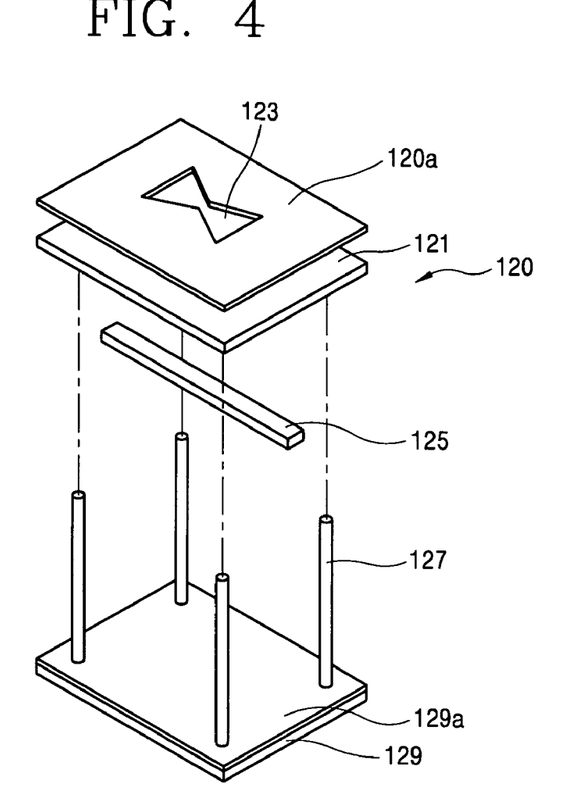
FIG. 4 is a disassembled perspective view showing a wireless antenna for a server in the wireless internal antenna for a home network and digital electric home appliance in accordance with the present invention.

The feeding line 125 of the wireless antenna for the server 120 is preferred to be shaped in a straight-line type in order to excite the antenna.

Figure 5:
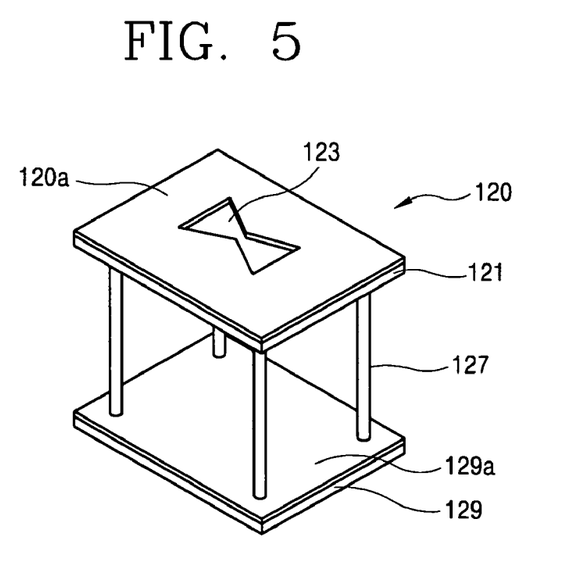
FIG. 5 is an assembled perspective view showing the wireless antenna for the server in the wireless internal antenna for a home network and digital electric home appliance in accordance with the present invention.
Figure 6:
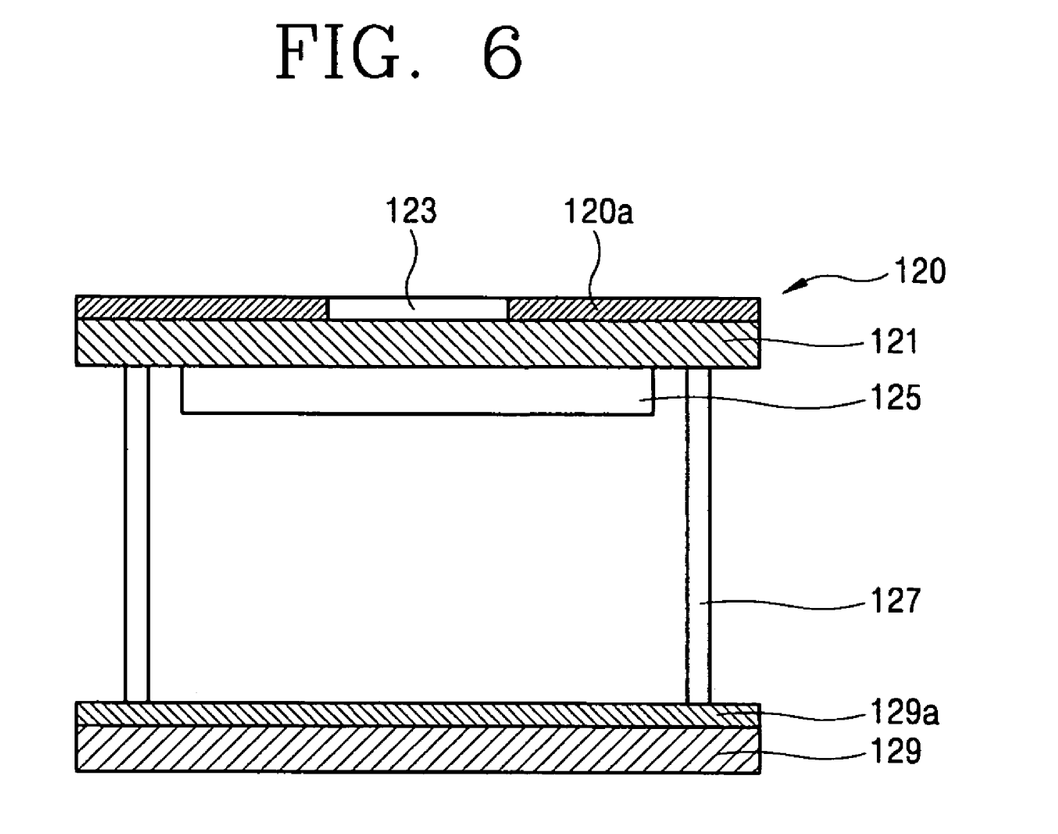
FIG. 6 is a cross-sectional view for the view shown in FIG. 4.

The server device 121 is horizontally positioned with respect to the ground plate 129, and the supporting portion 127 supports four edges of the server device 121. A connector (not shown) is installed at the ground plate 129 for an input/output signal.

Figure 14:
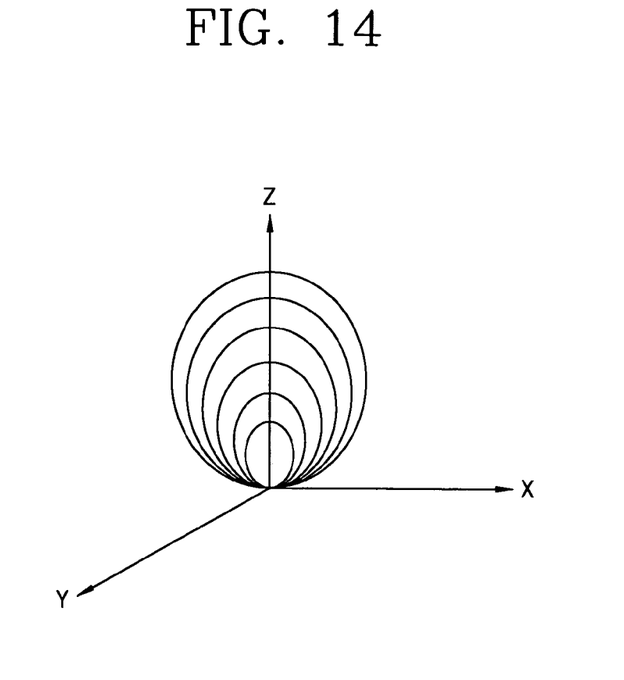
FIG. 14 is a perspective view showing an emission pattern of the wireless antenna for the server in the wireless internal antenna for a home network and digital electric home appliance in accordance with the present invention.

In order for the wireless antenna for the server 120 to have a directional emission pattern (refer to FIG. 14), a return portion 129a can be preferably formed at an upper surface of the ground plate 129.

An unexplained reference numeral 120a shows a conductor mounted on the upper surface of the server device 121 for forming the air slot 123.

Figure 7:
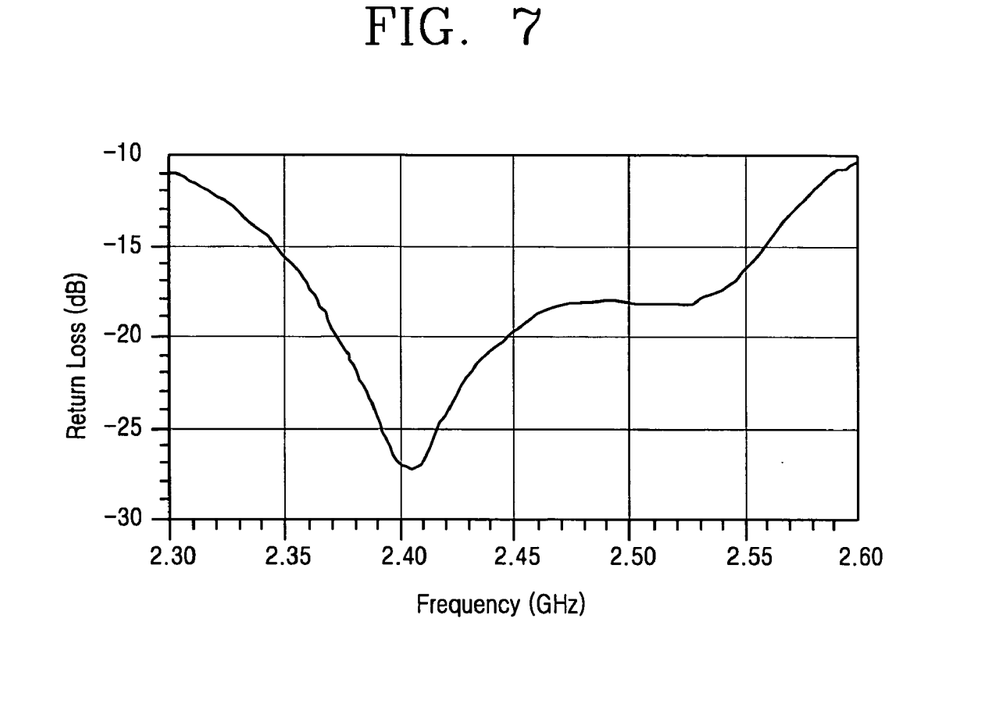
FIG. 7 is a graph showing a return loss of the wireless antenna for the client at the band of IEEE802.11b in the wireless internal antenna for a home network and digital electric home appliance in accordance with the present invention.
Figure 8:
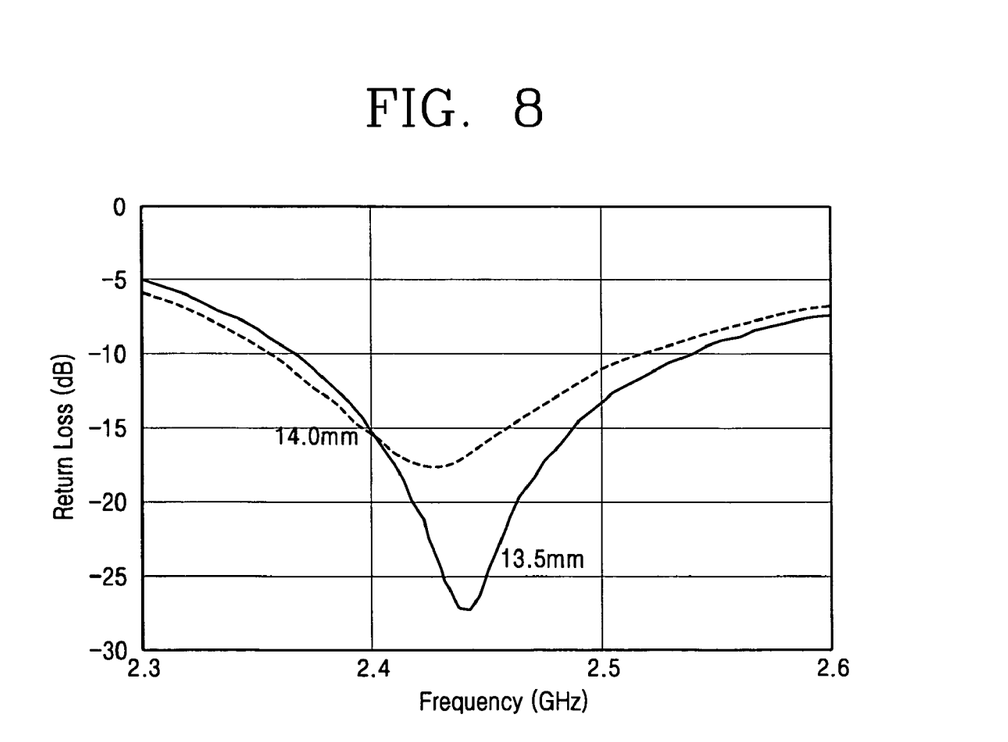
FIG. 8 is a graph showing a frequency variation according to a length of a tuning slot of a top pattern of the wireless antenna for the client in the wireless internal antenna for a home network and digital electric home appliance in accordance with the present invention.

FIG. 7 is a graph showing a return loss of the wireless antenna for the client at the band of IEEE802.11b in the wireless internal antenna for the home network and digital electric home appliance in accordance with the present invention, and FIG. 8 is a graph showing a frequency variation according to the tuning slot length of a top pattern of the wireless pattern for the client in the wireless internal antenna for the home network and digital electric home appliance in accordance with the present invention.

In the graph shown in FIG. 7, the axis of abscissa shows a corresponding frequency band, and the axis of ordinates shows a return loss, which illustrates that the smaller an absolute value of dB is, the smaller the return loss is. The wireless antenna in accordance with the present invention has obtained an impedance bandwidth, corresponding to −15 dB more than 200 MHz, including a band of 2.4 GHz~2.5 GHz, namely, a band of IEEE802.11b which is a standard wireless communication band.

As stated with reference to FIG. 7, the wireless antenna in accordance with the present invention has a relatively wide frequency bandwidth in comparison with the band of 2.4 GHz~2.5 GHz which is the conventional frequency band, resulting in minimizing a receive sensitivity degradation due to a frequency deviation generated by circumferential environments.

Referring to FIG. 8, the tuning slot 113 serves as a type of an impedance varying unit. That is, when the length (L) of the tuning slot is varied from 14. mm to 13.5 mm, it can be seen that a resonance frequency and an impedance matching are generated.

As can be seen from FIGS. 10A and 10B, the tuning slot 113 can be transformed into a shape similar to a triangle or a "T" type.

Furthermore, as shown in FIGS. 11A and 11B, the patch pole 115 can be transformed into a shape similar to a triangle or a square.

Figure 12:
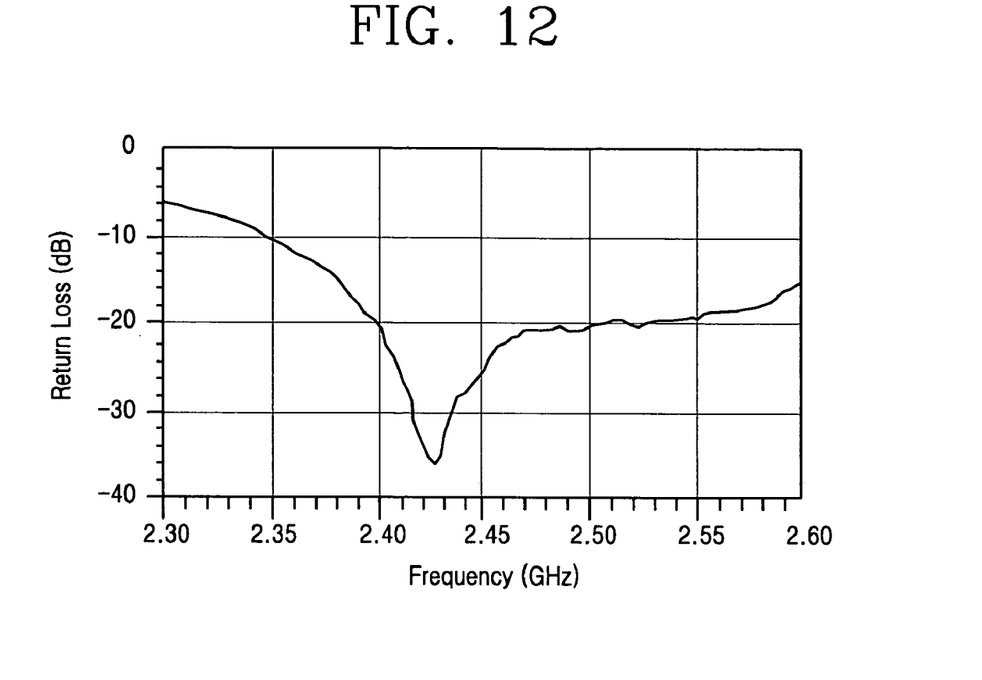
FIG. 12 is a graph showing a return loss of the wireless antenna for the server at the band of IEEE802.11b in the wireless internal antenna for a home network and digital electric home appliance in accordance with the present invention.
Figure 13:
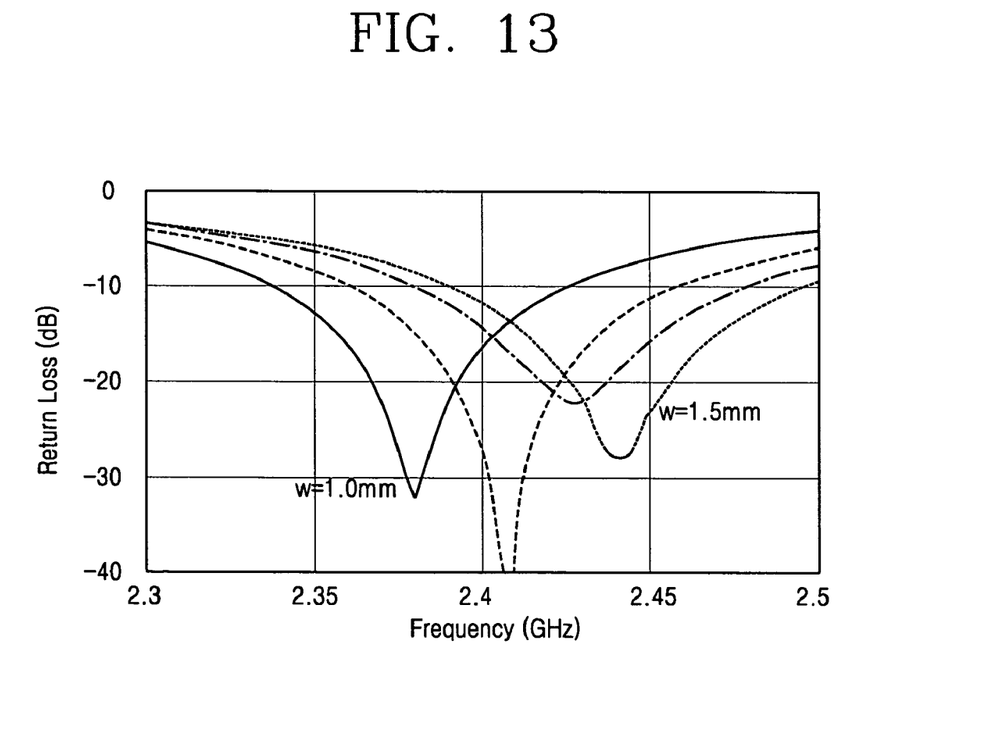
FIG. 13 is a graph showing a frequency variation according to a length of the top pattern of the wireless antenna for the server in the wireless internal antenna for a home network and digital electric home appliance in accordance with the present invention.

On the other hand, FIG. 12 is a graph showing a return loss of the wireless antenna for the server at a band of IEEE802.11b in the wireless internal antenna for the home network and digital electric home appliance in accordance with the present invention, and FIG. 13 is a graph showing a frequency variation according to a length of a top pattern of the wireless antenna for the server in the wireless internal antenna for the home network and digital electric home appliance in accordance with the present invention.

As stated with reference to FIG. 12, the wireless antenna in accordance with the present invention has obtained an impedance bandwidth, corresponding to −15 dB more than 300 MHz within a band of 2.37 GHz~2.6 GHz including the band of IEEE802.11b (a band of 2.4 GHz), which is a standard wireless communication band.

The wireless antenna in accordance with the present invention has a relatively wide frequency bandwidth in comparison with the band of 2.4 GHz~2.5 GHz, which is the conventional frequency band, which results in minimizing the receive sensitivity degradation due to the frequency deviation generated by circumferential environments.

Referring to FIG. 13, the tuning slot serves as an impedance varying unit. That is, the length of the tuning slot (W: refer to FIG. 4) is varied from 1 mm to 1.5 mm, it can be seen that a resonance frequency and an impedance matching are generated.

Figure 15:
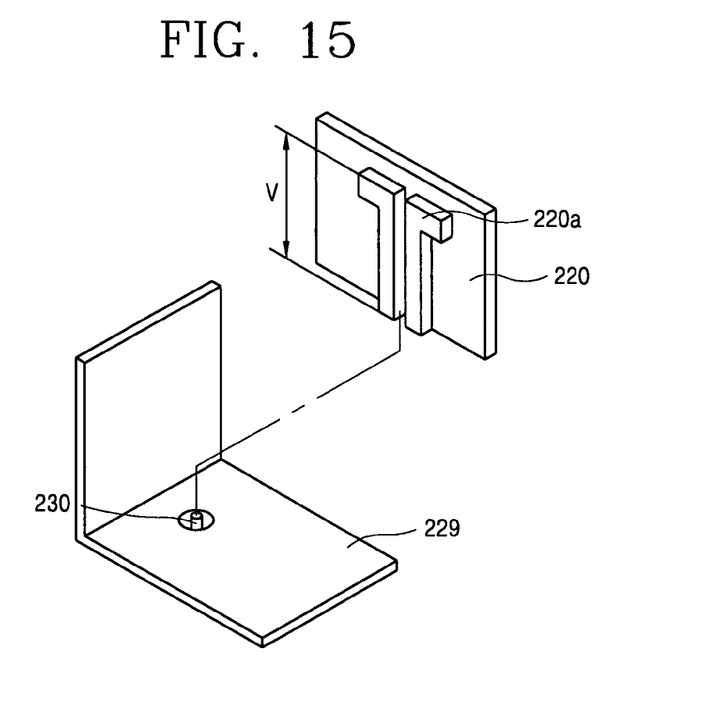
FIG. 15 is a perspective view showing a variation example of the wireless antenna for the server in accordance with the present invention.
Figure 16:
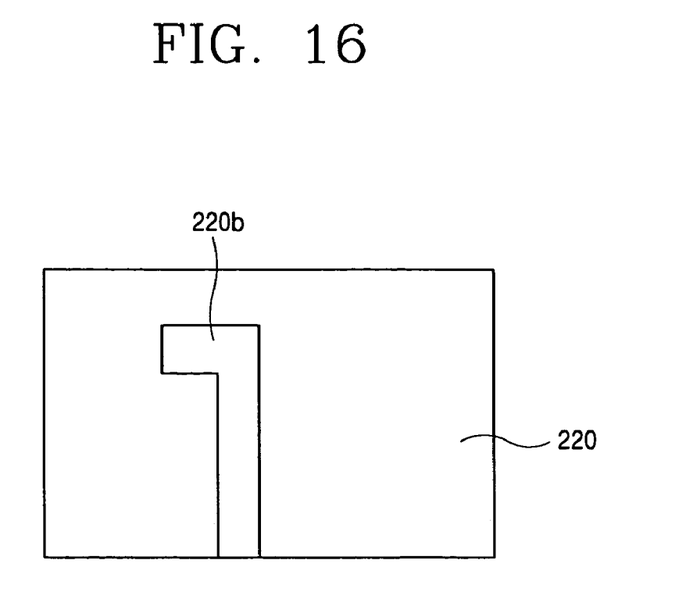
FIG. 16 is a bottom view of the wireless antenna for the server in accordance with the present invention.
Figure 17:
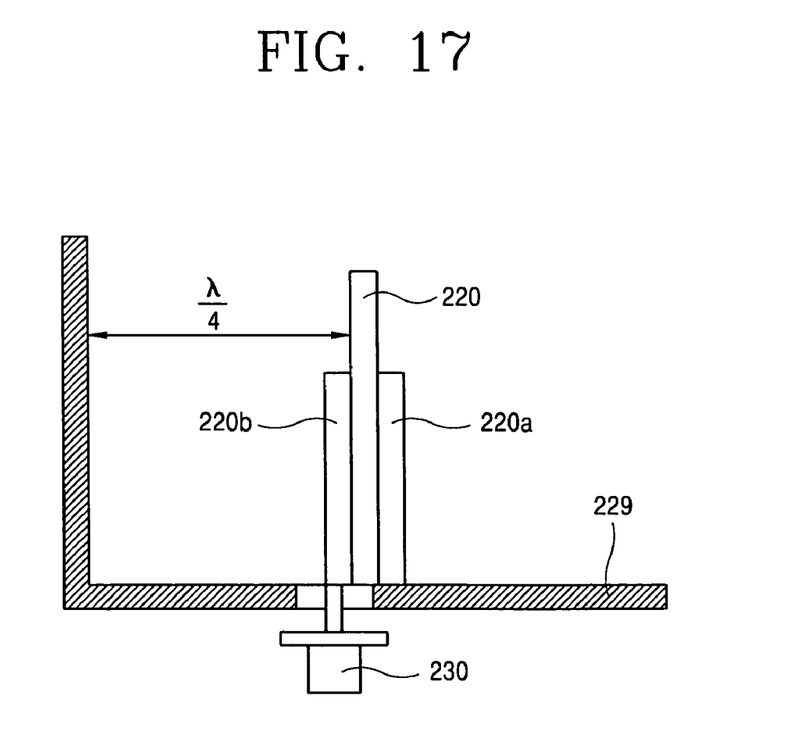
FIG. 17 is a cross-sectional view of the wireless antenna for the server in accordance with the present invention.

On the other hand, FIG. 15 is a perspective view showing a variation example of the wireless antenna for the server, FIG. 16 is a bottom view showing the variation example of the wireless antenna for the server, and FIG. 17 is a cross-sectional view showing the variation example of the wireless antenna for the server.

As shown in those drawings, in the variation example of the wireless antenna for the server, a server device 220 is vertically placed with respect to a ground plate 229. Furthermore, in forming a top pattern 220a and a bottom pattern 220b of the server device 220, the top pattern 220a is formed in "T" shape at one side surface of the server device 220, and the bottom pattern 220b is formed in "¬" shape at the other side surface of the server device 220. Here, the distance between the server device 220 and the ground plate 229 is established as λ/4. The length (V) of the top pattern 220a can be properly adjusted to generate a resonance frequency and an impedance matching.

Figure 18:
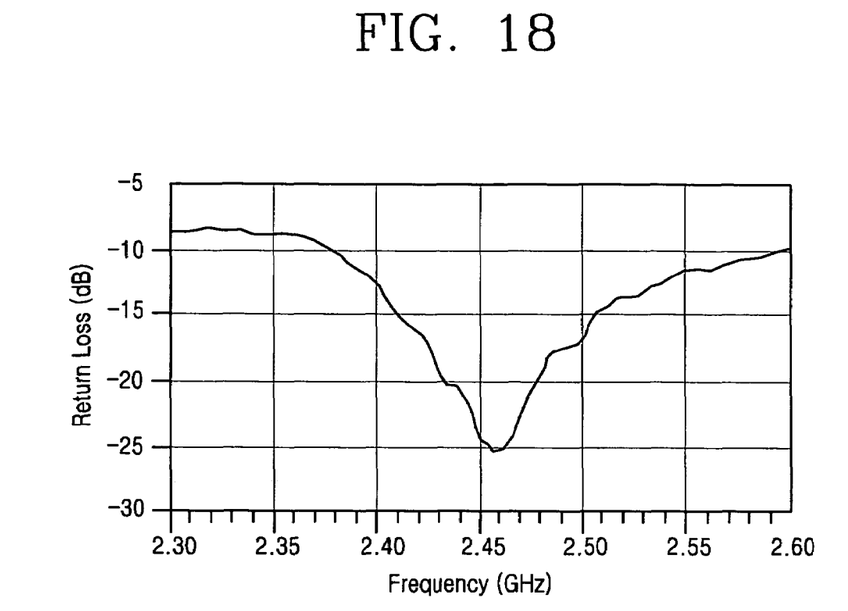
FIG. 18 is a graph showing a return loss of the wireless antenna for the server within the band of IEEE802.11b in the variation example of the antenna for the server in accordance with the present invention.
Figure 19:
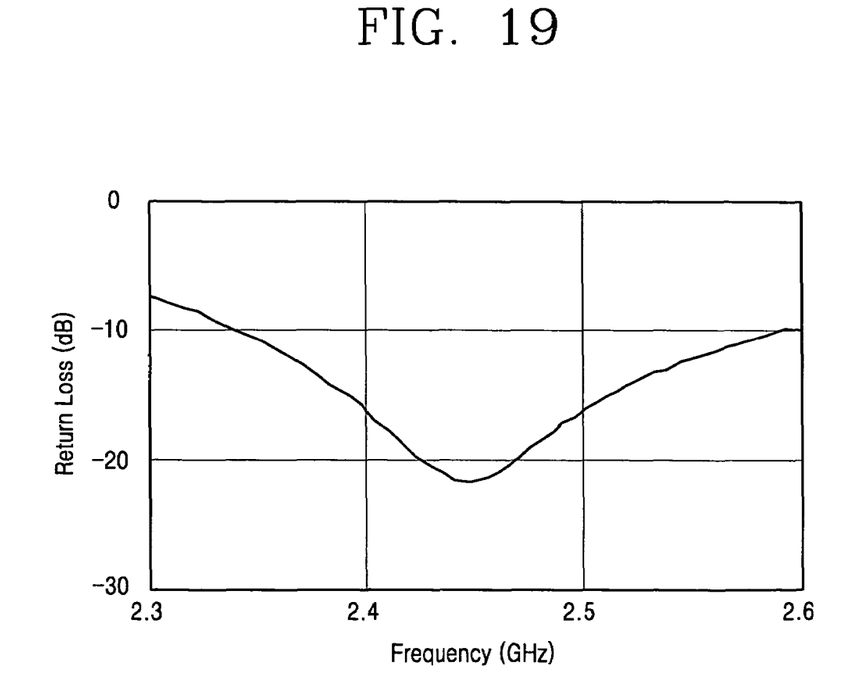
FIG. 19 is a graph showing a frequency variation according to a length of the top pattern of the wireless antenna for the server in the variation example of the antenna for the server in accordance with the present invention.

FIG. 18 is a graph showing a return loss of the wireless antenna for the server within a band of IEEE802.11b in the variation example of the antenna for the server in accordance with the present invention, and FIG. 19 is a graph showing a frequency variation according to the length of the top pattern of the wireless antenna for the server in the variation example of the wireless antenna for the server in accordance with the present invention.

Referring to FIGS. 18 and 19, the length (V) of the top pattern 220a (refer to FIG. 15) can be adjusted longer or shorter than the frequency of λ/4 thereby to generate a resonance frequency and an impedance matching.

The wireless antenna in accordance with the present invention has obtained an impedance bandwidth, corresponding to −15 dB more than 100 MHz, within a wireless communication band of 2.4 GHz~2.5 GHz, on the basis of the band of IEEE802.11b (a band of 2.4 GHz), which is a standard wireless communication band.

The wireless antenna for the client in accordance with the present invention has a relatively wide frequency bandwidth in comparison with the conventional frequency band of 2.4 GHz~2.5 GHz, thereby minimizing the receive sensitivity degradation due to a frequency deviation generated by circumferential environments.

As aforementioned, the wireless internal antenna for the home network and digital electric home appliance according to the present invention is mounted in the server or the client as a microminiature. As a result, the appearances of the server and the client can be protected and the damage thereon can be also prevented. Furthermore, the wireless internal antenna for the home network and digital electric home appliance according to the present invention can have superior characteristics with respect to the dual band of the band of IEEE802.11a (a band of 2.4 GHz) and the band of IEEE802.11b (a band of 5 GHz).

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A wireless internal antenna for a home network and digital electric home appliance, comprising:
    a wireless antenna for a client having a tuning slot at an upper surface of a client device to realize an impedance matching at a first communication band and having a certain type patch pole at a lower surface of the client device to have a return loss at a second communication band; and
    a wireless antenna for a server, enabling transmission/reception to/from the client device, having an air slot at an upper surface of a server device and a feeding line formed at a lower surface thereof, and the server device is supported at a ground plate by a supporting portion installed at a lower part thereof,
    wherein a length of the tuning slot of the wireless antenna for the client is selected such that a bandwidth of the wireless antenna is greater than the first communication band to minimize a receive sensitivity degradation of the wireless antenna due to the wireless antenna for the client being at the upper surface of the client device.

2. The antenna of claim 1, wherein the first communication band is a band of IEEE802.11b (a band of 2.4 GHz) and the second communication band is a band of IEEE802.11a (a band of 5 GHz).

3. The antenna of claim 1, wherein the slot of the wireless antenna for the server is one of a bowtie shape, a rectangular shape, or "H" shape.

4. The antenna of claim 1, wherein the feeding line of the wireless antenna for the server is a straight-line shape.

5. The antenna of claim 1, wherein the tuning slot of the wireless antenna for the client is one of a rectangular shape, a triangular shape, or "T" shape.

6. The antenna of claim 1, wherein the patch pole of the wireless antenna for the client is one of a circular shape, a triangular shape, or a square shape.

7. The antenna of claim 1, wherein the server device is horizontally positioned with respect to the ground plate.

8. The antenna of claim 1, wherein the supporting portion supports four edges of the server device.

9. The antenna of claim 1, wherein the wireless antenna for the server has a portion at an upper surface of the ground plate to make the wireless antenna have a directional emission pattern.

10. The antenna of claim 1, wherein the wireless antenna for the client has a non-directional emission pattern.

11. The antenna of claim 1, wherein the server device is vertically positioned with respect to the ground plate.

12. The antenna of claim 11, wherein the wireless antenna for the server has a "T" shape pattern on a first side surface of the server device.

13. The antenna of claim 12, wherein the wireless antenna for the server has a "⌐" shape pattern on a second side surface of the service device that is opposite to the first side surface.

14. The antenna of claim 1, wherein the wireless antenna for the client is mounted flush with the upper surface of the client device.

15. A wireless internal antenna for a home network and digital electric home appliance, comprising:
a server antenna having an air slot at an upper surface of a server device and a feeding line at a lower surface of the server device, said server antenna configured to communicate in a preexisting frequency range and the server device is supported at a ground plate by a supporting portion installed at a lower part thereof,
wherein a length of the air slot of the server antenna is selected such that a bandwidth of the server antenna is greater than the preexisting frequency range to minimize a receive sensitivity degradation of the server antenna due to the server antenna being at the upper surface of the server device.

16. The antenna of claim 15, wherein the air slot of the server antenna for the server is one of a bowtie shape, a rectangular shape, or "H" shape.

17. The antenna of claim 15, wherein the feeding line of the server antenna is a straight-line shape.

18. The antenna of claim 15, wherein the server device is horizontally positioned with respect to the ground plate.

19. The antenna of claim 15, wherein the supporting portion supports four edges of the server device.

20. The antenna of claim 15, wherein the server antenna has a portion formed at an upper surface of the ground plate to make the server antenna have a directional emission pattern.

21. The antenna of claim 15, wherein the server device is vertically positioned with respect to the ground plate.

22. The antenna of claim 21, wherein the server antenna has a "T" shape pattern on a first side surface of the server device.

23. The antenna of claim 22, wherein the server antenna has a "⌐" shape pattern on a second side surface of the server device.

24. The antenna of claim 15, wherein the server antenna is mounted flush with the upper surface of the server device.

25. A wireless internal antenna for a home network and digital electric home appliance, comprising:
a client antenna having a tuning slot at an upper surface of a client device to realize an impedance matching within a band of IEEE802.11b, and having a certain shape patch pole at a lower surface of the client device to have loss characteristics at a band of IEEE802.11a,
wherein a length of the tuning slot of the client antenna is selected such that a bandwidth of the client antenna is greater than the band of IEEE802.11b to minimize a receive sensitivity degradation of the client antenna due to the client antenna being at the upper surface of the client device.

26. The antenna of claim 25, wherein the tuning slot of the client antenna is one of a rectangular shape, a triangular shape or "T" shape.

27. The antenna of claim 25, wherein the patch pole of the client antenna is one of a circular shape, a triangular shape or a square shape.

28. The antenna of claim 25, wherein the client antenna has a non-directional emission pattern.

29. The antenna of claim 25, wherein the client antenna is mounted flush with the upper surface of the client device.

* * * * *